Dec. 22, 1970 R. B. ROBROCK II 3,550,035

PUSH-PULL OSCILLATOR EMPLOYING A PAIR OF BULK SEMICONDUCTOR DEVICES

Filed Dec. 20, 1968

INVENTOR
R. B. ROBROCK II
BY Leonard W. Arnold
ATTORNEY

United States Patent Office 3,550,035
Patented Dec. 22, 1970

3,550,035

PUSH-PULL OSCILLATOR EMPLOYING A PAIR OF BULK SEMICONDUCTOR DEVICES

Richard B. Robrock II, Matawan Township, Monmouth County, N.J., assignor to Bell Telephone Laboratories, Incorporated, Murray Hill, N.J., a corporation of New York Filed Dec. 20, 1968, Ser. No. 785,654
Int. Cl. H03b 7/06
U.S. Cl. 331—107 2 Claims

ABSTRACT OF THE DISCLOSURE

A push-pull oscillator employing two series connected bulk semiconductor devices in which domains are alternately nucleated to drive an RLC resonant circuit connected to the common junction of the devices.

BACKGROUND OF THE INVENTION

This invention relates to oscillator circuits which employ as the active device any bulk semiconductor which exhibits the phenomenon of domain nucleation and propagation. The mechanism for this observed phenomenon is believed to result from the carriers in such materials exhibiting negative incremental mobility over a range of applied electric field. The source of this negative incremental mobility is vastly different from one material to the next. In gold doped Ge it may be attributed to a field dependent trapping effect, in CdS to phonon-electron interaction, while in GaAs, InP, CdTe, ZnSe and others it is believed to be the result of an intervalley scattering mechanism. The basic theory of these devices is set forth in detail in a series of papers in the January 1966 IEEE Transactions on Electron Devices, volume ED–13, No. 1, and September 1967 IEEE Transactions on Electron Devices, volume ED–14, No. 9.

As set forth in the papers mentioned above, when an increasing voltage is applied to opposite ends of a suitable sample of a bulk semiconductor, such as n-type gallium arsenide, the average current in the sample increases almost linearly with voltage until a critical threshold value is reached at which point the current drops sharply to a fraction of its maximum value. The instantaneous current waveform is then found to oscillate periodically between this reduced value and the maximum value with the frequency of these oscillations related to the sample length. The critical voltage at which the drop in current in the sample takes place and at which oscillations are initiated is termed the threshold voltage, $V_T$.

Present theory holds that these oscillations result from the nucleation of domains in a region near the negative electrode (cathode) and the propagation of these domains toward the positive electrode (anode). Subsequent to the phenomenon of nucleation, a domain grows to a stable shape for devices of uniform doping and cross-section, and continues to drift towards the positive electrode. The domain propagation continues even if the applied voltage is lowered, as long as this voltage remains above a minimum value which is termed the domain sustaining voltage, $V_{DS}$. If the applied voltage exceeds a value known as the oscillation sustaining voltage, $V_{OS}$, then the arrival of a domain at the anode results in the nucleation of a new domain near the cathode. The continued nucleation, propagation, and dissolution of domains produces coherent oscillations in the current waveform. If the applied voltage, however, is less than $V_{OS}$ but greater than $V_{DS}$, then the dissolution of a domain at the anode returns the device to its original ohmic state.

SUMMARY OF THE INVENTION

In accordance with a preferred embodiment of the present invention, a pair of substantially identical two-valley bulk semiconductor devices is connected in series across a pair of DC voltage sources such that each of the bulk devices is biased at a voltage equal to the sum of the threshold voltage plus the domain sustaining voltage, divided by two, $$\frac{V_T+V_{DS}}{2}$$

The common junction of the two devices is connected to the parallel combination of an inductance, a capacitance and a resistance which forms a tank circuit such that the common junction drives the tank circuit. The output signal is taken at the common junction of the two devices and it has been found that a nearly sinusoidal waveform is generated with a period approximately equal to twice the transit time of the domain of a single device. As a result, the circuit functions as a push-pull oscillator.

BRIEF DESCRIPTION OF THE DRAWINGS

This invention will be more fully comprehended from the following detailed description taken in conjunction with the drawings in which.

DETAILED DESCRIPTION

Figure 1:
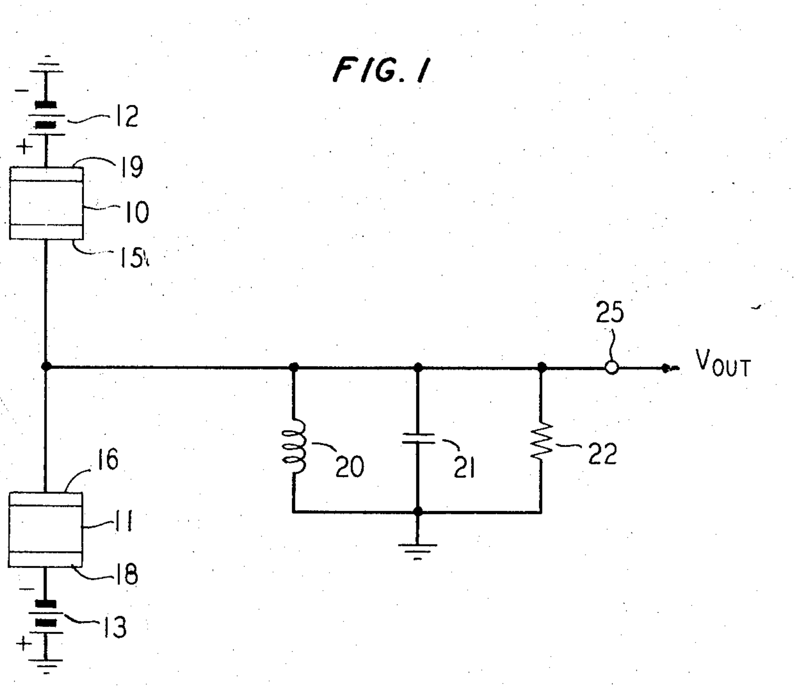
FIG. 1 is a schematic diagram of a push-pull oscillator embodying the present invention.

FIG. 1 shows in schematic diagram form the basic elements of a push-pull oscillator in accordance with the present invention. A pair of substantially identical bulk semiconductor devices 10 and 11 are connected in series between a source 12 of positive voltage and a source 13 of negative voltage. Each of the two-valley semiconductor devices has an anode and a cathode and the cathode 15 of device 10 is directly connected to the anode 16 of device 11. The cathode 18 of device 11 is directly connected to negative voltage source 13 and similarly, the anode 19 of device 10 is directly connected to source 12 of positive voltage. The voltage bias $V_B$ provided by each of the sources 12 and 13 is in a preferred embodiment of this invention equal to $$\frac{V_T+V_{DS}}{2}$$

where $V_T$ is the threshold voltage of each device and $V_{DS}$ is the domain sustaining voltage.

The common junction of cathode 15 and anode 16 is connected to a tank circuit comprising the parallel combination of an inductor 20, a capacitor 21 and a resistor 22. The output voltage is taken directly across the tank circuit. It has been found that when the sources 12 and 13 are turned on, the resulting circuit is activated so that a nearly sinusoidal signal is produced at output terminal 25. It has been further found that the frequency of the oscillation is approximately equal to twice the transit time of a domain in the bulk semiconductor device.

Figure 2:
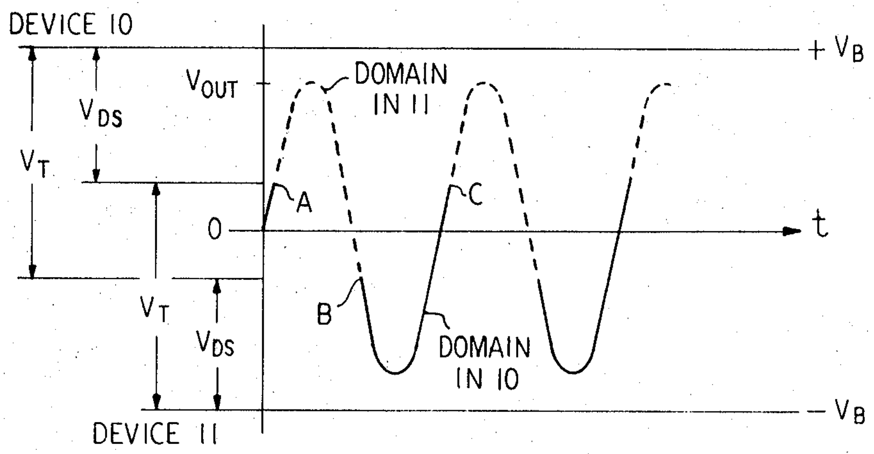
FIG. 2 illustrates the sinusoidal output of the oscillator shown in FIG. 1.

The output waveform at terminal 25 is illustrated in FIG. 2. Consider the output waveform from a point in time denoted as A in FIG. 2. At point A the output voltage has risen to a value such that the voltage across device 11, which is the voltage $V_B$ of source 13 plus the output voltage $V_{OUT}$, is equal in magnitude to $V_T$. It is at this point that a domain is generated in device 11 and the device 11 continues to remain in the resulting low current state until the voltage across the device drops below the domain sustaining voltage $V_{DS}$. This point is reached at point B in FIG. 2 wherein the output voltage has dropped to a value such that the voltage across the device 11 is exactly equal to $V_{DS}$. At this point, however, the voltage across device 10, which is equal to the difference between the source voltage 12 and the output voltage is equal to $V_T$, the threshold voltage of the device 10. As a result, a domain is nucleated in device 10 and the resulting low current continues in device 10 until the output voltage rises to that denoted by point C wherein the process is repeated again.

As can be seen from the above, where the voltage $V_B$ is equal to $$\frac{V_T+V_{DS}}{2}$$

a domain is propagated through device 10 during negative excursions of the output voltage and a domain is propagated through device 11 during positive excursions of the output voltage. In such a situation the period of oscillation of the output signal is approximately equal to twice the transit time of a domain through the device.

In contrast with the above embodiment, if the bias voltage $V_B$ of sources 12 and 13 is made less than $$\frac{V_T+V_{DS}}{2}$$

then a domain is not nucleated in the devices 10 and 11 until the output voltage reaches a higher level in each sinusoid than points A and B. Consequently, the portion of the half of the sinusoid during which a domain is nucleated is less than that illustrated in FIG. 2 with the result that some distortion appears in the output signal. Similarly, if the bias voltage is made greater than $$\frac{V_T+V_{DS}}{2}$$

then domains will be nucleated for lower values of the output signal and wil continue for longer periods of time into the opposite excursion of the output signal. As a result, the domain propagation in the two devices will overlap and distortion may again be introduced into the output signal.

Thus, in accordance with this invention, a very simple push-pull oscillator circuit is provided using two bulk semiconductor devices and a tank circuit. The resulting circuit has great potential for use in high-speed applications.

Various embodiments and modifications other than those described herein may be made by those skilled in the art without departing from the spirit and scope of the invention.

I claim:

1. A push-pull oscillator for generating waveforms comprising:

a pair of bulk semiconductor devices each having an anode and a cathode;

a direct connection between the cathode of a first of said devices and the anode of a second of said devices;

a circuit comprising the parallel combination of a resistor, a capacitor, and an inductor, one terminal of said circuit being connected to the junction of said cathode of said first device and the anode of the second of said devices and the other terminal connected to a reference voltage terminal;

and means providing a bias voltage across each of said devices so that domains are alternately nucleated in said devices.

2. A push-pull oscillator for generating sinusoidal waveforms comprising:

a pair of substantially identical bulk semiconductor devices each having an anode and a cathode;

a direct connection between the cathode of a first of said devices and the anode of a second of said devices;

a circuit comprising the parallel combination of a resistor, a capacitor, and an inductor, one terminal of said circuit being connected to the junction of the cathode of said first device and the anode of said second device and the other terminal of said circuit being connected to a reference voltage terminal;

a first bias voltage source connected between the anode of said first device and said reference voltage terminal;

a second bias voltage source connected between the cathode of said second device and said reference voltage terminal;

said first and said second bias voltages each being equal to $$\frac{V_T+V_{DS}}{2},$$

where $V_T$ is the threshold level of the bulk semiconductor device and $V_{DS}$ is the domain sustaining voltage of each device;

whereby domains are alternately nucleated in each device and the voltage across said circuit is nearly a sinewave having a period approximately equal to twice the transit time of a domain in said bulk device.

References Cited

UNITED STATES PATENTS 3,452,221 6/1969 Gunn -------------- 331—107

JOHN KOMINSKI, Primary Examiner

U.S. Cl. X.R.

317—234; 331—114